3,459,795
NOVEL QUATERNARY PHOSPHONIUM SALTS
Arlen W. Frank, Grand Island, and Irving Gordon, Niagara Falls, N.Y., assignors to Hooker Chemical Corporation, Niagara Falls, N.Y., a corporation of New York
No Drawing. Filed May 26, 1966, Ser. No. 553,023
Int. Cl. C07f 9/54
U.S. Cl. 260—526         5 Claims

ABSTRACT OF THE DISCLOSURE

Quaternary phosphonium salts of the formula $$[R_2R^1PR^2COOH]^+X^-$$

wherein R is a lower alkyl, $R^1$ is higher alkyl, $R^2$ is lower alkylene and X is a halogen, are novel compounds, useful as detergents, surface active agents, sequestrants, emulsifiers, plasticizers and thickeners.

---

This invention relates ot the preparation of novel quaternary phosphonium salts. More particularly, this invention relates to the preparation of unsymmetrical quaternary phosphonium salts having as substituents thereon a carboxy alkyl radical, as well as both long and short chain aliphatic radicals.

It is an object of this invention to prepare novel quaternary phosphonium halide salts. Another object of this invention is to prepare such phosphonium salts which exhibit unusual surface active properties.

These and other objects will become apparent to those skilled in the art from the following detailed description.

The unsymmetrical phosphonium salts of this invention may be represented by the following formula:

$$[(R)_2(R^1)P(R^2CO_2H)]^+X^-$$

wherein R is the same or different alkyl radical having 1 to 6 carbon atoms, preferably 1 to 3 carbon atoms, $R^1$ is alkyl of 7 to 15 carbon atoms, preferably 10 to 12 carbon atoms, $R^2$ is an alkylene radical having 1 to 6 carbon atoms, preferably 1 to 3 carbon atoms, and X is halogen, preferably chlorine or bromine. Typical examples of such compounds include, among others, carboxymethyl dimethyl lauryl phosphonium chloride, carboxymethyl dimethyl lauryl phosphonium bromide, carboxyethyl dimethyl lauryl phosphonium chloride, carboxypropyl dimethyl lauryl phosphonium bromide, carboxybutyl dimethyl lauryl phosphonium chloride, carboxymethyl diethyl decyl phosphonium chloride, carboxyethyl dipropyl octyl phosphonium bromide, and the like.

In accordance with the practice of this invention, the new compounds are prepared by reacting a tertiary phosphine with a halo-substituted monocarboxylic acid, and separation of the desired carboxyalkyl trialkyl phosphonium halide from the reaction mixture.

The tertiary phosphine compounds which may be employed in the practice of this invention are characterized by the formula $(R)_2(R^1)P$, wherein R and $R^1$ are as previously described. Examples of these are dimethyloctylphosphine, dimethylnonylphosphine, diethyldecylphosphine, dipropylundecylphosphine, dimethyldodecylphosphine, diethyldodecylphosphine, dipropyldodecylphosphine, and the like.

The halo-substituted monocarboxylic acids employed in the practice of the invention have the formula $R^2XCO_2H$, wherein $R^2$ and X are as previously described. These are exemplified by chloroacetic acid, bromoacetic acid, chloropropionic acid, bromopropionic acid, chlorobutyric acid, bromovaleric acid, chlorocaproic acid, and the like.

The reaction between the tertiary phosphine and halo-substituted monocarboxylic acid may be effected by mixing the reactants together in a suitable means, such as means adapted for batch reactions, at a temperature ranging from 50 to 150 degrees centigrade, preferably at a temperature of 70 to 100 degrees centigrade.

The reaction can be carried out most conveniently at atmospheric pressures. However, if preferred, pressures either higher or lower than atmospheric pressure may be employed. The relative amounts of the reactants employed are not critical, though it is desirable that substantial excesses of either reactant be avoided. It is preferred to react the tertiary phosphine and halo-substituted monocarboxylic acid in substantially stoichiometric proportions, about 1 molar proportion of tertiary phosphine being reacted with 1 molar proportion of halo-substituted monocarboxylic acid.

If desired, the reaction may be carried out in the presence of a solvent, such as acetonitrile or the like. The removal of the solvent may be accomplished by suitable means, e.g., distillation. Upon completion of the reaction, the desired reaction product may be separated from the reaction mixture by processes such as crystallization or the like.

The novel compounds of the invention find particular utility as detergents, surface active agents, emulsifiers, plasticizers, sequestering agents, thickeners, and may be used in foodstuffs, dentifrices, cleansing compounds, motor oils and the like.

The following example is presented for the purpose of illustrating the novel phosphonium compounds and their preparation. It is to be understood that the invention is not intended to be restricted to this specific illustrative example and that other modifications and equivalents are included in the invention. In the example, temperatures are given in degrees centigrade and parts are parts by weight.

EXAMPLE 1

Preparation of carboxymethyl dimethyl lauryl phosphonium chloride.

To a reaction vessel were added 12.0 parts (1 molar proportion) of dimethyllaurylphosphine, 5.0 parts (1 molar proportion) of chloroacetic acid, and 60 parts of acetonitrile. The reaction mixture was heated at reflux for 12 hours. Following the reaction the product separated on cooling as a light, white solid. The collected precipitate was washed with acetonitrile and dried, yielding 10.2 parts (60 percent) of carboxymethyldimethyllaurylphosphonium chloride as a white powder having a melting point of 117–118.5 degrees centigrade. The product was analyzed and found to contain 9.9 percent of phosphorus and 11.2 percent of chlorine. The calculated percentages of these elements in $C_{16}H_{34}ClO_2P$, are 9.5 parts of phosphorus and 10.9 parts of chlorine.

Upon replacement of dimethyllaurylphosphine with a compound such as dimethyloctylphosphine, dimethylnonylphosphine, diethyldecylphosphine, dipropylundecylphosphine, dimethyldodecylphosphine, diethyldodecylphosphine or dipropyldodecylphosphine, the corresponding carboxymethyl phosphonium chloride is produced.

In a similar manner, upon replacement of chloroacetic acid with a compound such as bromoacetic acid, chloropropionic acid, bromopropionic acid, chloropropionic acid, bromopropionic acid, chlorobutyric acid, bromovaleric, or chlorocaproic acid, the corresponding phosphonium halide is produced.

It is also within the scope of the invention to react any one of the mentioned acids with any one of the mentioned tertiary phosphines to produce a phosphonium salt similar to that of Example 1.

It is to be understood that the foregoing detailed description is merely given by way of illustration and is not intended to limit the scope of the invention in any way for many variations may be made therein without departing from the scope of the invention.

What is claimed is:
1. A phosphonium compound of the formula

$$[(R)_2(R^1)P(R^2CO_2H)]^+X^-$$

wherein R is alkyl of 1 to 3 carbon atoms, $R^1$ is alkyl of 10 to 12 carbon atoms, $R^2$ is alkylene of 1 to 6 carbon atoms and X is halogen.

2. A phosphonium compound according to claim 1, wherein X is selected from the group consisting of chlorine and bromine.

3. A phosphonium compound according to claim 1 wherein $R^2$ is of 1 to 3 carbon atoms.

4. In accordance with claim 1, the compound carboxymethyl dimethyl lauryl phosphonium chloride.

5. In accordance with claim 1, the compound carboxymethyl dimethyl laurylphosphonium bromide.

References Cited

UNITED STATES PATENTS 3,125,555    3/1964    Paré et al. _____ 260—89.1

OTHER REFERENCES

Bissing: Journal of Organic Chemistry, vol. 30, pp. 1296–8 (April 1965).

LORRAINE A. WEINBERGER, Primary Examiner

M. G. BERGER, Assistant Examiner